United States Patent
Hung et al.

[11] Patent Number: 6,137,205
[45] Date of Patent: Oct. 24, 2000

[54] SPINDLE STRUCTURE OF A MOTOR ROTOR

[75] Inventors: Tunpo Hung, Feng-Yuan; Ying-Chih Huang, No. 46, Lane 585, Sec. 1, Feng-Shi Rd., Feng-Yuan City, Taichung, both of Taiwan

[73] Assignees: Tun-Po Hung; Ying-Chih Huang; Chia-Ching Liu, all of Taichung, Taiwan

[21] Appl. No.: 09/408,488

[22] Filed: Sep. 30, 1999

[51] Int. Cl.[7] .............................. H02K 1/04; H02K 15/00
[52] U.S. Cl. .............................. 310/261; 310/43; 310/45; 310/42
[58] Field of Search ............................... 310/43, 42, 261, 310/262, 264, 265; 29/596–598

[56] References Cited

U.S. PATENT DOCUMENTS

| | | | |
|---|---|---|---|
| 2,488,729 | 11/1949 | Kooyman | 310/261 |
| 2,756,354 | 7/1956 | Baron | 310/261 |
| 3,737,987 | 6/1973 | Bednarski | 29/596 |
| 3,986,253 | 10/1976 | Harris | 428/314.4 |
| 4,263,711 | 4/1981 | Sakano et al. | 29/597 |
| 4,484,094 | 11/1984 | Ade et al. | 310/43 |
| 4,823,032 | 4/1989 | Ward et al. | 310/43 |
| 4,833,769 | 5/1989 | Tomite et al. | 29/597 |

*Primary Examiner*—Nestor Ramirez
*Assistant Examiner*—Tran N. Nguyen
*Attorney, Agent, or Firm*—Charles E. Baxley

[57] ABSTRACT

A spindle structure of a motor rotor is disclosed. An insulating layer is integrally formed between the spindle and the silicon steel pieces of the motor by injection. Two sun plates are integrally formed at the insulating layer and clamp the two ends of the silicon steel pieces. Trenches are formed on the spindle. In the each of the positions that the insulating layer is connected to the sun plates, a rib with a predetermined height is integrally formed for enhancing the stability of the center of gravitation and the magnetic flux, and for enhancing the connection between the spindle, silicon steel pieces and the sun plates. Furthermore, two ladder shape buckling portions are formed at the insulating layer and outside the sun plates for positioning a fan.

5 Claims, 6 Drawing Sheets

SPINDLE STRUCTURE OF A MOTOR ROTOR

BACKGROUND OF THE INVENTION

1. Field of the Invention

The present invention relates to a spindle structure of a motor rotor, and especially to a motor rotor having double insulation function and capable of suffering from a large twisting force so as to be manufactured conveniently,

2. Description of the Prior Art

With reference to FIG. 4~6, a prior art spindle of a motor rotor is illustrated. A plurality of silicon steel pieces 44 are installed around the spindle 40. Two ends of the spindle 40 are installed with sun plates 46 for clamping the silicon steel pieces 44. An insulating layer 42 made of BMC (a thermosetting plastics) is formed at the periphery of the metal spindle 40, then the spindle 40 of the insulating layer 42 passes through the silicon steel pieces 44 by tightly matching the two components. After all the components of the rotor are assembled, copper wires winds around the silicon steel pieces 44. A bearing, a rectifier, a fan, etc, are installed at the spindle 40 for forming a complete motor.

Moreover, the spindle 40 of a motor rotor is formed by metal. The spindle 40 and the silicon steel pieces 44 are manufactured individually. Then, the spindle 40 is tightly matched with the silicon steel pieces 44. Therefore, when the centers of the spindle 40 and the silicon steel pieces 44 are not well aligned, after assembling the spindle 40 and the silicon steel pieces 44, it is necessary to modify the silicon steel pieces 44 in order that centers of the spindle 40 and the silicon steel pieces 44 can be aligned. If the spindle 40 and the silicon steel pieces 44 are not aligned, the silicon steel pieces 44 will be modified with a large degree so that the outer diameter of the silicon steel pieces 44 is reduced. Thus, the gaps in the rotor become large so that the magnetic flux is affected and so thus the efficiency of the operation of the motor.

In such a prior art motor rotor, although an insulating layer 42 may be formed between the metal spindle 40 and the silicon steel pieces 44 so that the draining current will not flow to the spindle 40 through the silicon steel pieces 44. Therefore, two insulation functions are formed. However, since the combining strength of the insulating layer 42 made of BMC and other material and the spindles 40 is smaller than that of the metal spindle 40 and the silicon steel pieces 44. As a consequence, during operation of the rotor in the larger twisting force, the spindle 40 will easily rotate with respect to the silicon steel pieces 44 so that angle shifts are generated between the rectifier and the silicon steel pieces 44. Thus, the electromechanical angle of the motor operation is affected. Therefore, such a motor rotor spindle 40 having the function of dual insulation can not be used in a motor operating in a large power. The applications are confined largely.

Alternatively, when an insulating layer 42 is formed on the metal spindle 40, as that described above, the combination strength between the insulating layer 42 and the silicon steel pieces 44 is smaller, in order to avoid that a relative rotation is generated between the motor 40 and the insulating layer 42. A pressed texture 402 is formed on the surface of the metal spindle 40 (as shown in FIGS. 5) for increasing the friction force between the metal spindle 40 and the insulating layer 42 so that the metal spindle 40 will not rotate with respect to the insulating layer 42. However, the pressed texture 402 on the surface of the metal spindle 40 will cause some discharging tips are formed on the surface of the spindle 40. Therefore, once the rotor electrically operates, a tip discharging will possibly generate, and thus the insulation of the motor becomes worse.

Moreover, despite of a motor with a metal spindle 40 having an insulating layer 42, the sun plates 46 at two sides of the silicon steel pieces 40 are engaged with the spindle 40, respectively, after the spindle 40 is combined with the silicon steel pieces 42, respectively. Thus, not only the manufacturing process of the motor rotor is increased, but also since the sun plate 46 have a thickness and a length without being adjusted, once an error is occurred in the length of the silicon steel pieces 44, then an error is formed between the length of the silicon steel pieces 44 plus the sun plate 46, respectively, and the winding length of the rotor, and therefore, the magnetic flux of the rotor is affected.

Furthermore, since the spindle 40 or the insulating layer 42 and the silicon steel pieces 44 are engaged tightly, thus the size control between the spindle 40, the insulating layer 42 and the silicon steel pieces 44 must be careful. Once a large error is generated, then a large gap is formed between the spindle 40, or the insulating layer 42 and the silicon steel pieces 44, respectively. Thus, a relative rotation is possible generated between the spindle 40 and the silicon steel pieces 44, respectively, so that a bad operation efficiency of the motor is induced. Therefore, when the rotor is manufactured, a precise size control must be performed and thus the manufactured process is complicated and troublesome.

SUMMARY OF THE INVENTION

Accordingly, the primary object of present invention is to provide a spindle structure of a motor rotor, wherein an insulating layer is integrally formed between the spindle and the silicon steel pieces of the motor by injection. Two sun plates are integrally formed at the insulating layer and clamp the two ends of the silicon steel pieces. Trenches are formed on the spindle in each position of the insulating layer connected to the sun plates. A rib with a predetermined height is integrally formed for enhancing the stability of the center of gravitation and the magnetic flux, and for enhancing the connection between the spindle, silicon steel pieces and the sun plates. Moreover, two ladder shape buckling portions are formed at the insulating layer and outside the silicon steel pieces for positioning a fan. Furthermore, there are two trenches with helical shapes, and one crosses over the other.

The various objects and advantages of the present invention will be more readily understood from the following detailed description when read in conjunction with the appended drawing.

DESCRIPTION OF THE PREFERRED EMBODIMENTS

Figure 1:
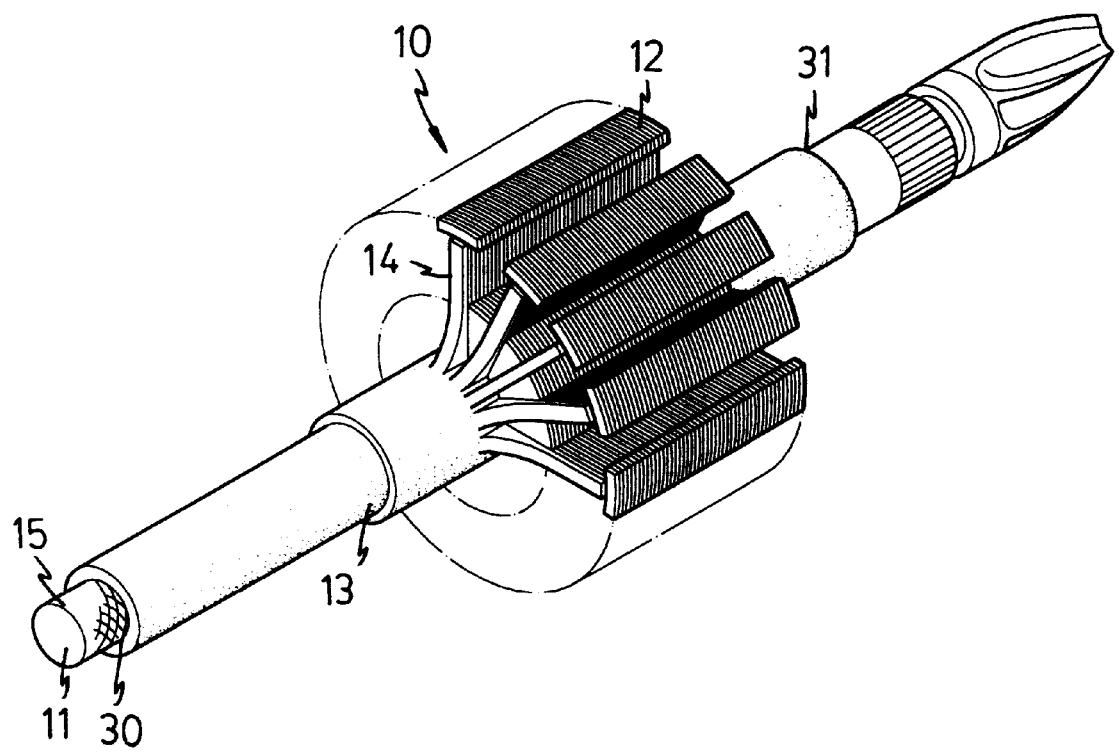
FIG. 1 shows a perspective view of motor rotor according to the present invention.
Figure 2:
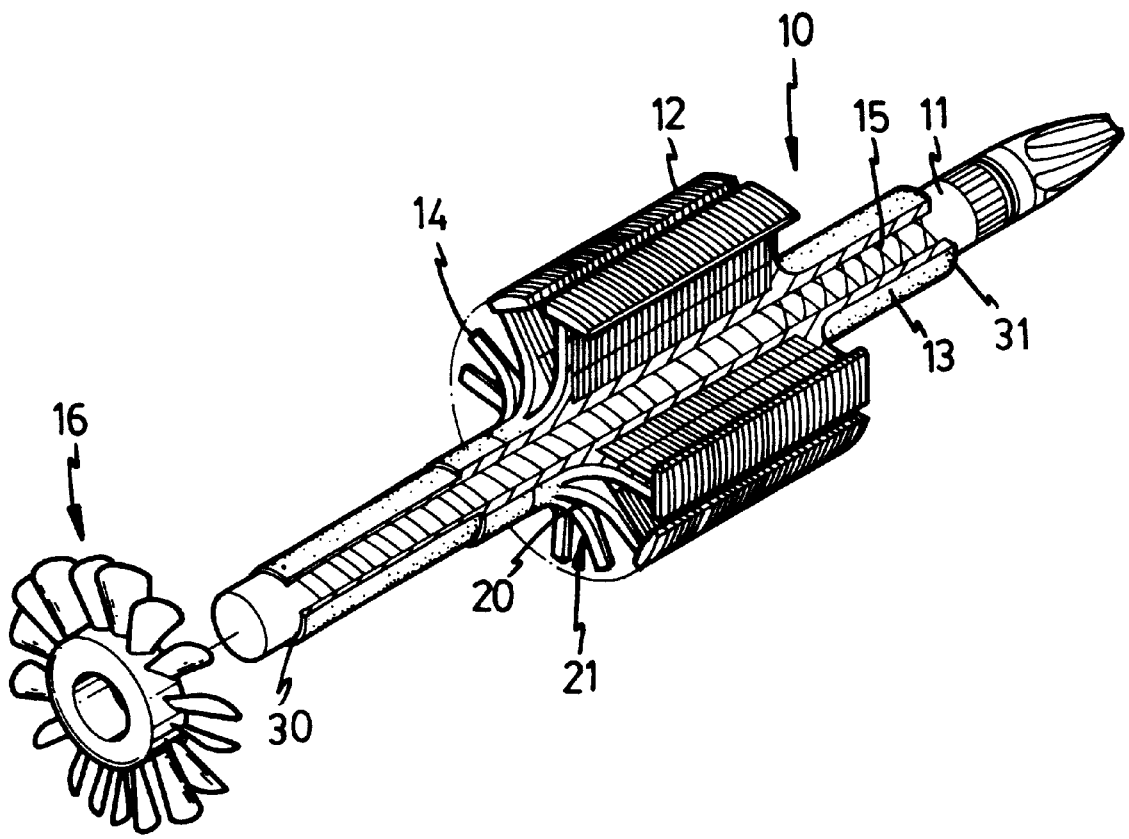
FIG. 2 is a partial cross sectional perspective view of the motor rotor according to the present invention.
Figure 3:
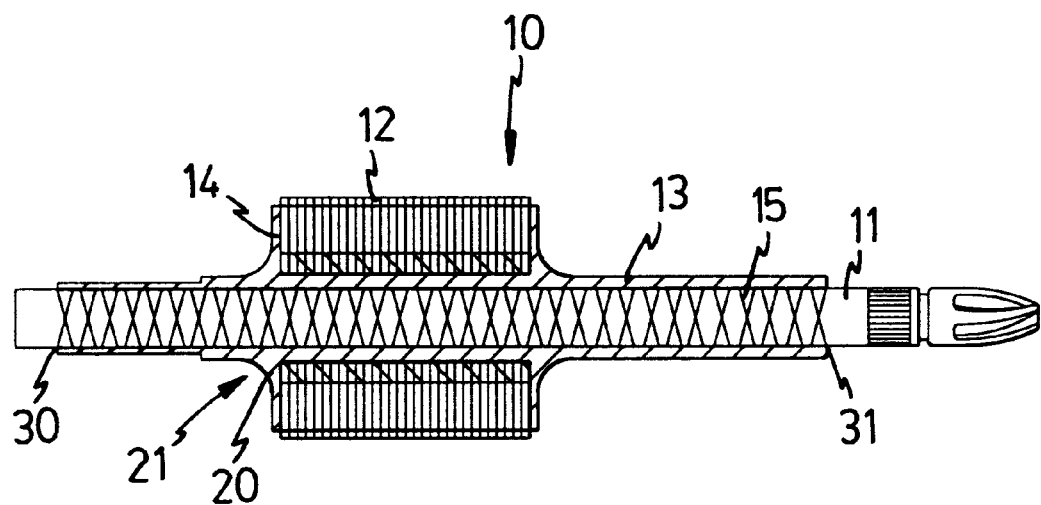
FIG. 3 is a plan view showing of the motor rotor according to the present invention.
Figure 4:
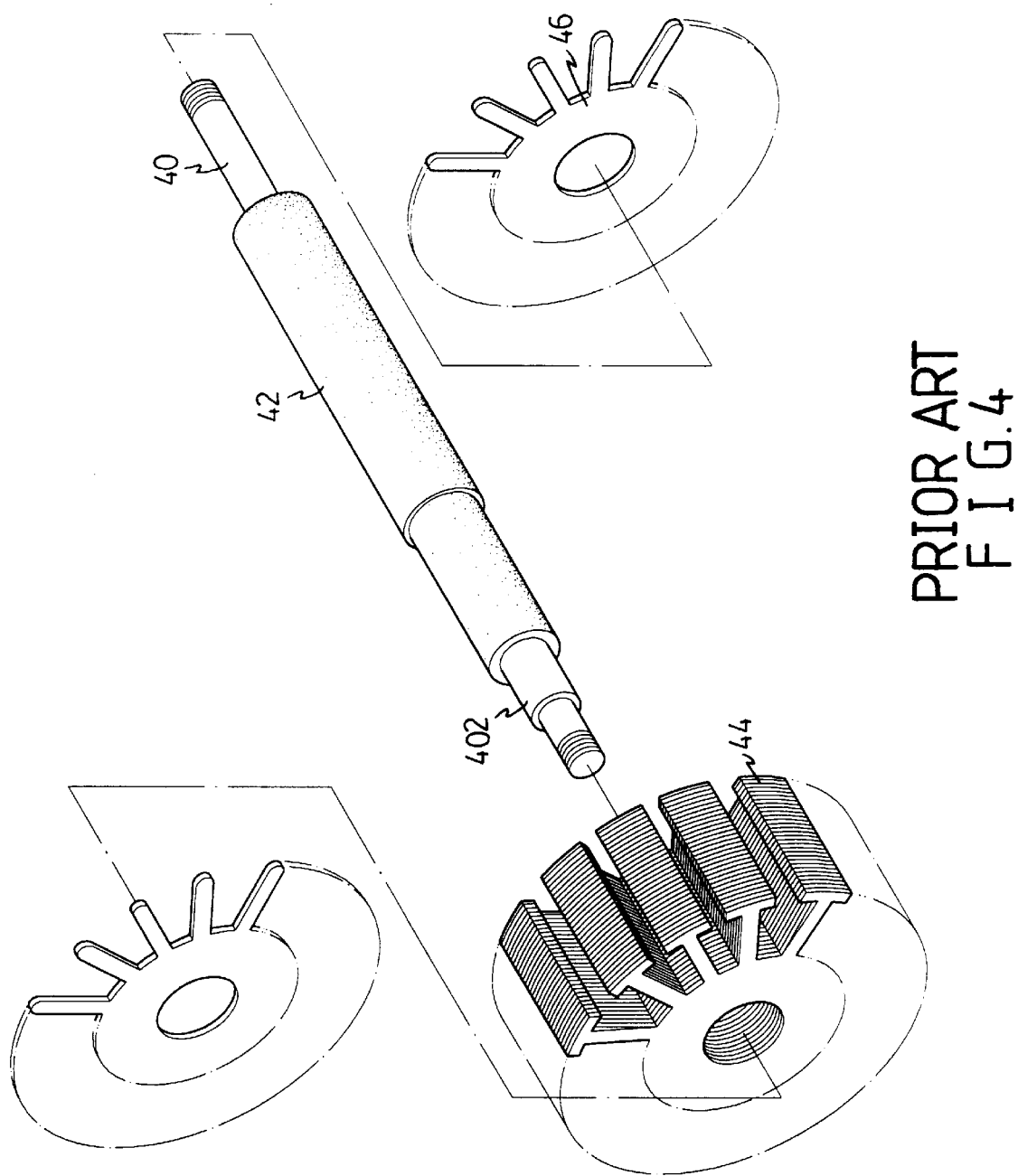
FIG. 4 is an exploded perspective view schematically showing a prior art motor rotor.
Figure 5:
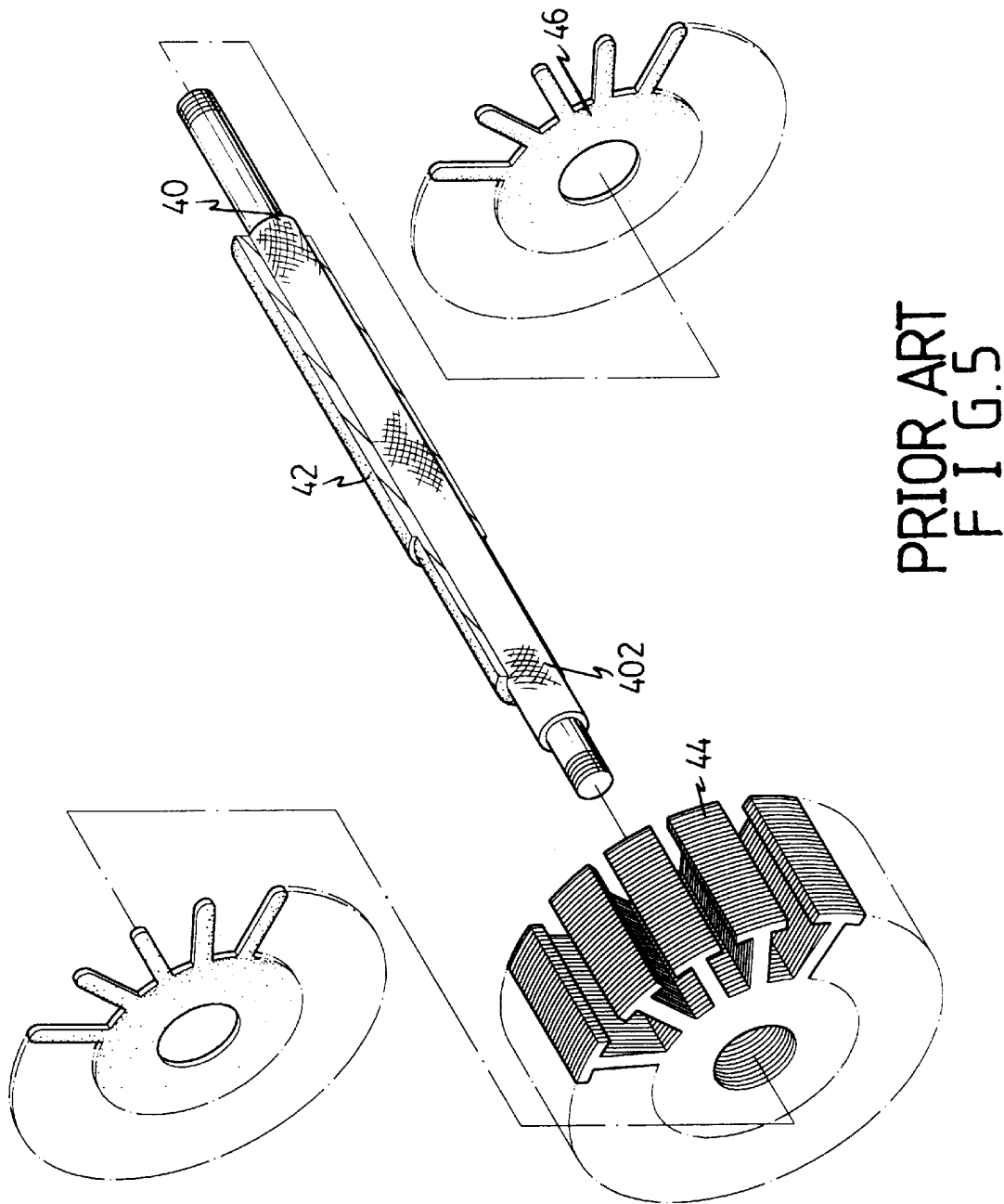
FIG. 5 is a partial cross sectional view schematically showing the prior art motor rotor.
Figure 6:
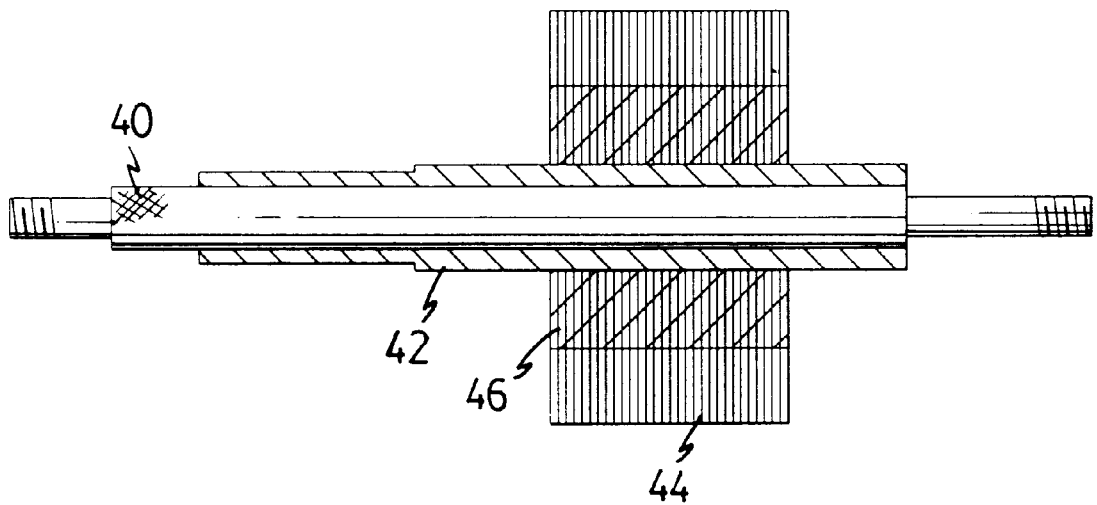
FIG. 6 is a plan view schematically showing the prior art motor rotor.

With reference to FIGS. 1~3, the perspective view and partial cross sectional view of the present invention is illustrated. It can be appreciated from the figures that the motor rotor 10 of the present invention is formed by a spindle 11, silicon steel pieces 12, an insulating layer 13 with two sun plates 14 which are formed integrally by injection, ribs 20 with a predetermined height is integrally formed in respective positions of the convex portions of the insulating layer 13 and the sun plates 14. The silicon steel pieces 12 are clamped between the two sun plates 14 formed integrally at the insulating layer 13. During forming the rotor 10, the silicon steel pieces 12 and the spindle 11 can be placed into the molds individually and then the spindle 11 passes through the silicon steel pieces 12 axially. Then the insulating materials, such as BMC or PBT (thermosetting plastics) is injected into the mold so that the insulating material encloses the spindle 11 and then further fills into the gap between the spindle 11 and the silicon steel pieces 12. After the insulating material cools, an insulating layer 13 is formed. Thus, by the insulating material, the spindle 11 and the silicon steel pieces 12 are combined with one another. Moreover, at the time that the insulating layer is injected for forming a shape, sun plates 14 and ribs 20 are formed integrally. Therefore, the manufacturing of a motor rotor is completed.

Referring to FIG. 3, since an insulating layer is formed between the spindle 11 and the silicon steel pieces 12, thus, current will not flow from the silicon steel pieces 12 to the spindle 11 so that current does not drain out. In a test performed by the inventor, it is discovered that under the condition of 4500 volt and 0.1 mA, a pressure tolerance test is performed to the silicon steel pieces 12 and the spindle 11 for one minute, the current will not pass through the insulating layer 13 to the spindle 11. Therefore, good pressure tolerance and insulation of the motor rotor of the present invention is illustrated.

Moreover, referring to FIGS. 2 and 3, it is appreciated that two interleaved helical shape trenches 15 with opposite directions are formed at the surface of the spindle 11. By these trenches 15, as the insulating layer 13 is injected out for being formed with a shape, it can extend into the trenches 15 at the surface of the spindle 11. Not only the combination strength between the spindle 11 and the insulating layer 13 is increased in order to avoid too large twisted force is formed between the spindle 11 and the insulating layer 13 so that the two components rotate to one another, but also by the trenches, the tip discharging of the spindle 11 will be avoided.

Furthermore, since the insulating layer 13 is integral formed between the spindle 11 and the silicon steel pieces 12, when irregular gaps are formed on the inner rim of the silicon steel pieces 12 due to improper machining, the gap will be filled by the insulating layer. Thus, the combination strength between the insulating layer 13 and the silicon steel pieces 12 is enhanced. Moreover, the relative rotation between the insulating layer 13 and the silicon steel pieces 12 is avoided. Furthermore, the relative rotation between the spindle 11 and the silicon steel pieces 12 are avoided. Therefore, the operation of the motor has a preferred effect and may suffer a large twisting force.

Besides, the sun plates 14 of the present invention are integral formed with the insulating layer 13. With reference to FIGS. 2, the width of the sun plates 14 can be properly adjusted by adjusting mold. Therefore, even some error is occurred in the silicon steel pieces 12, the length of the sun plates 14 and the silicon steel pieces 12 can be adjusted by adjusting the sun plates 14 so that the rotor 10 has a predetermined winding length. Therefore, the rotor 10 of the motor has a predetermined magnetic flux to retain a preferred efficiency.

Moreover, the rib 20 has a predetermined arc 21. Two ladder shape buckling portions 30 and 31 are formed at a predetermined positions of the insulating layer 13. The rib 20 serves to increase the connecting area between the insulating layer 13 and the sun plates 14, in order that the sun plates 14 for clamping the silicon steel pieces 12 may have a sufficient connecting area during long period of operation. Alternatively, the thermal melting in the insulating layer 13 and the sun plates 14 does not cause the shift between the insulating layer 13 and the sun plates 14 and thus, no relative rotation is generated therebetween. By aforesaid construction, the present invention indeed has a preferred tolerance than that in the first embodiment.

Moreover, since the rib 20 in the present invention has a predetermined arc 21, as a copper wire 16 winds the silicon steel pieces 12 and the sun plates 14 at two sides thereof, since the rib 20 is located between each convex portion 15 of the insulating layer 13 and the sun plates 14, thus the copper wire will enclose the rib 20 with a predetermined arc 21 so that the copper wire is wound tightly and has the effect of positioning and balance.

Another, two ladder shape buckling portions 30 and 31 are formed on a predetermined position of the insulating layer 13 so that a fan 16 can be located on the buckling portions 30 or 31 of the insulating layer 13 directly. Thus, the fan 16 can be engaged on the insulating layer certainly.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A spindle structure of a motor rotor comprising a spindle and a plurality of silicon steel pieces, wherein an insulating layer is integrally formed between the spindle and the silicon steel pieces of the motor, two sun plates are integrally formed on the insulating layer and clamp the two ends of the silicon steel pieces, and trenches are formed in the spindle, there are two trenches with helical shapes, and one crosses over the other; in each of the positions that the insulating layer is connected with the sun plates, a rib with a predetermined height is integrally formed for enhancing the stability of the center of gravitation and the magnetic flux, and for enhancing the connection between the spindle, the silicon steel pieces and the sun plates.

2. The spindle structure of a motor rotor as claimed in claim 1, wherein two ladder shape buckling portions are formed at the insulating layer and outside the sun plates for positioning fans.

3. The spindle structure of a motor rotor as claimed in claim 1, wherein the ribs have a predetermined arc so that a copper wire can wind around the ribs.

4. The spindle structure of a motor rotor as claimed in claim 1, wherein the insulating layer is made of thermosetting plastics.

5. The spindle structure of a motor rotor as claimed in claim 1, wherein the insulating layer made of thermoplastics.

* * * * *